United States Patent [19]

Lin

[11] Patent Number: 4,638,195
[45] Date of Patent: Jan. 20, 1987

[54] MULTIPLE-POLE STEPPING MOTOR

[76] Inventor: Ted T. Lin, 20850 Stevens Creek Blvd., Cupertino, Calif. 95014

[21] Appl. No.: 700,039

[22] Filed: Feb. 11, 1985

[51] Int. Cl.$^4$ .............................................. H02K 37/00
[52] U.S. Cl. .................................... 310/49 R; 318/696
[58] Field of Search ........................... 310/12–14, 310/49; 318/135, 696

[56] References Cited

U.S. PATENT DOCUMENTS

| | | | |
|---|---|---|---|
| 3,510,699 | 5/1970 | Frederickson | 310/49 |
| 3,601,640 | 8/1971 | Egawa | 310/49 |
| 3,751,696 | 8/1973 | Morreale | 310/162 |
| 3,866,104 | 2/1975 | Heine | 310/49 G |
| 4,095,161 | 6/1978 | Heine et al. | 310/49 X |
| 4,112,319 | 9/1978 | Field | 310/49 R |
| 4,385,247 | 5/1983 | Satomi | 310/49 |

*Primary Examiner*—Donovan F. Duggan

[57] ABSTRACT

A multiple-pole stepping motor includes M stator windings distributed on M/2 groups and coacting with a permanent magnet rotor for hybrid stepper and a soft iron rotor for a variable reluctant stepper. The two stator windings in each group are connected in series with different winding polarity. The uniform pole angle 360°/M is to facilitate the winding process. The angles $\alpha$ and $\alpha'$ are pitches between adjacent teeth of adjacent poles in the group, the angles $\beta$ and $\beta'$ are pitches between adjacent teeth on adjacent groups, having a relationship with step angle t:

$$\left. \begin{array}{l} \alpha = 2 \times (2n + 1) \times t \\ \beta = (2m + 1) \times t \end{array} \right\} \text{ for hybrid stepping motor}$$

$$\left. \begin{array}{l} \alpha' = 4n' \times t \\ \beta' = (2m' + 1) \times t \end{array} \right\} \text{ for variable reluctant stepping motor}$$

In this relation m, n, m' and n' are integer greater than zero.

8 Claims, 30 Drawing Figures

Winding F 1

FIG. 5

|  | $A_i$ | $\bar{A}_i$ | $B_i$ | $\bar{B}_i$ |
|---|---|---|---|---|
| S1 | N | S | — | — |
| S2 | N | S | N | S |
| S3 | — | — | N | S |
| S4 | S | N | N | S |
| S5 | S | N | — | — |
| S6 | S | N | S | N |
| S7 | — | — | S | N |
| S8 | N | S | S | N | i represents 1, 2, 3, 4

FIG. 6

Winding F 2

FIG. 7

| | $A_i'$ | $\bar{A}_i'$ | $B_i'$ | $\bar{B}_i'$ | $C_i'$ | $\bar{C}_i'$ | $D_i'$ | $\bar{D}_i'$ |
|---|---|---|---|---|---|---|---|---|
| S'1 | N | S | — | — | — | — | — | — |
| S'2 | N | S | N | S | — | — | — | — |
| S'3 | — | — | N | S | — | — | — | — |
| S'4 | — | — | N | S | N | S | — | — |
| S'5 | — | — | — | — | N | S | — | — |
| S'6 | — | — | — | — | N | S | N | S |
| S'7 | — | — | — | — | — | — | N | S |
| S'8 | N | S | — | — | — | — | N | S | i represents 1, 2

FIG. 8

FIG. 9A
At stage S 2

FIG. 10a
at state S'2

FIG. 9b
at stage S 3

FIG. 10b
at stage S'3

FIG. 9c
at stage S 4

FIG. 10c
at stage S'4

MULTIPLE-POLE STEPPING MOTOR

FIELD OF INVENTION

This invention relates to stepping motors and particularly to an improved step accuracy and step response design for a stepping motor.

DISCUSSION OF PRIOR ART

Many prior art stepping motors using multiple-pole M. are constrained to uniform pole teeth divisions exhibit the relationships $$M = K \times \text{number of phases}$$

$$\text{number of steps per revolution}/M = K'$$

Wherin, K and K' are integers greater than zero the constraints limit the number of pole M, which becomes important, especially in the fast step response motor required low inductance. Doubling the number of poles will reduce the phase inductance in half while maintaining a similar holding torque.

In addition to that, customarily, such motors utilize a winding configuration for higher torque at two-phase operation relative to one-phase operation due to the shorter magnetic path at two-phase mode, which exhibit substainially step accuracy problem during the half-stepping operation, i.e. one-phase and two-phase are turned "ON" alternatively. Although a compensation circuit can be added into the stepping motor drive to eliminate the problem. However, it is still a challenge for stepping motor manufacturers to produce motors with same amount of error consistantly.

OBJECTS

According to a feature of the invention, these objects are obtained in a multiple-pole M, stepping motors of the type employing a stator winding distributed on M/2 groups each having two main poles, each of the main poles connected in series with different winding polarity.

An object of this invention is to improve step accuracy, particularly for half-stepping operation.

Another object of this invention is to accept high stepping frequency.

These and other features of the invention pointed out in the claim. Further objects and advantages of my invention will become apparent from a consideration of the drawings and ensuring description/operation thereof.

DESCRIPTION OF MOTOR/OPERATION OF MOTOR

Figure 1:
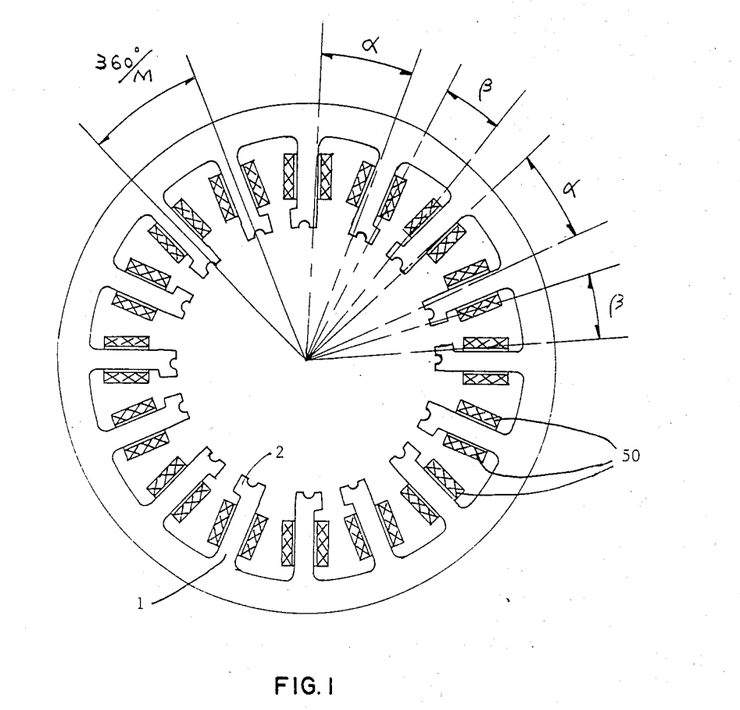
FIG. 1 is a schematic sectional view of a hybrid stepping motor stator embodying features of the invention.
Figure 3:
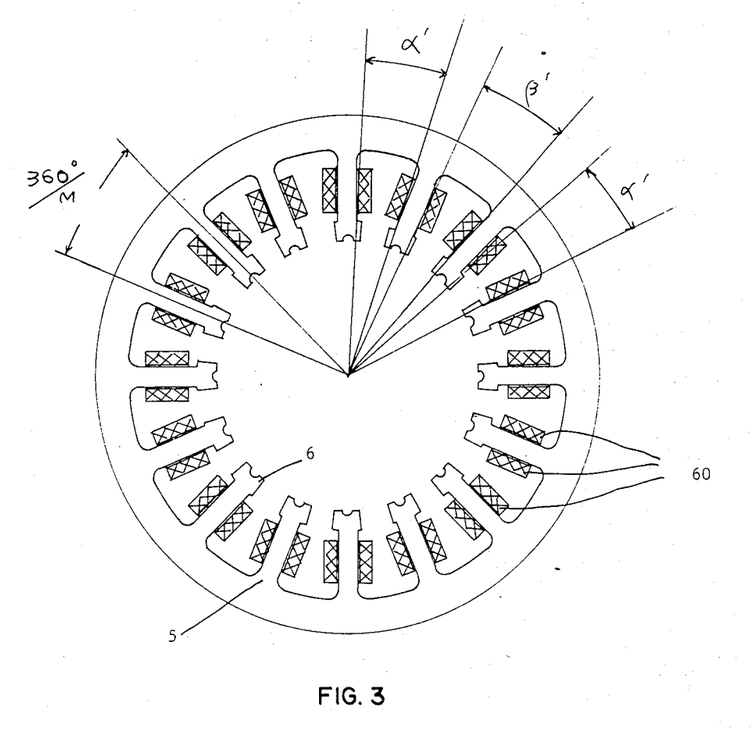
FIG. 3 is a schematic sectional view of a variable reluctance stepping motor stator embodying features of the invention.

In FIG. 1 and FIG. 3 represent a hybrid stepping motor and variable reluctant motor having 16 stator windings which radially arranged stator main poles 1 with one or several pole teeth 2.

The stator body is composed of punched and superimposed sheets or plates. In the embodiment of FIG. 1 or FIG. 3, a stepping motor includes a stator winding distributed on M/2 groups each having two main poles, each of the main poles in the group connected in the different winding sense of direction. According to one embodiment of the invention, this is accomplished by a series of connections.

Figure 2:
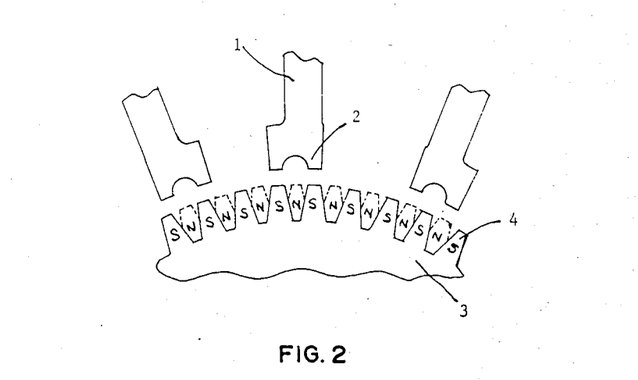
FIG. 2 is a schematic representation of details of a stator of the motor in FIG. 1.

In the usual manner of a hybrid stepping motor, the rotor is composed of a central magnet which is magnetized in the axial direction. Tangentially toothed pole caps or pole shoes 3 of soft magnetic material carry the magnetic flux lines of the central magnet. As shown in FIG. 2 the teeth 4 of the two pole caps or pole shoes are tangentially offset relative to each other by one half-pole division.

Figure 4:
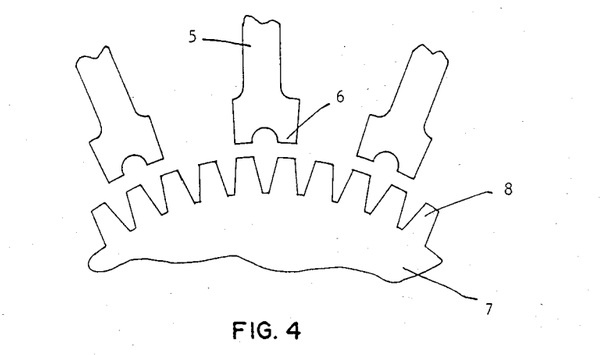
FIG. 4 is a schematic representation of details of a stator of the motor in FIG. 3.

In the variable reluctant stepping motor, the rotor is unexcited. It is made of magnetically soft iron with the teeth on the periphery, which are attracted to the energized stator teeth. As shown in FIG. 4 the teeth 4 of the rotor lined up with the energized stator pole teeth 2 of pole A1 and A1'.

According to an aspect of the invention, the following are critical importance in the construction of the motor. The stator pole teeth 2 of FIG. 1 must be related as follows:

$$\alpha = 2 \times (2n+1) \times t$$

$$\beta = (2m+1) \times t$$

The stator pole teeth 6 of FIG. 3 must be related as follows:

$$\alpha' = 4 \times n' \times t$$

$$\beta' = (2m'+1) \times t$$

Where m, n, m', n' are integers greater than zero, t is the step angle, $\alpha$, $\alpha'$ are the angle between adjacent teeth of adjacent poles in the group, $\beta$, $\beta'$ are the angle between adjacent teeth on adjacent groups.

Figure 5:
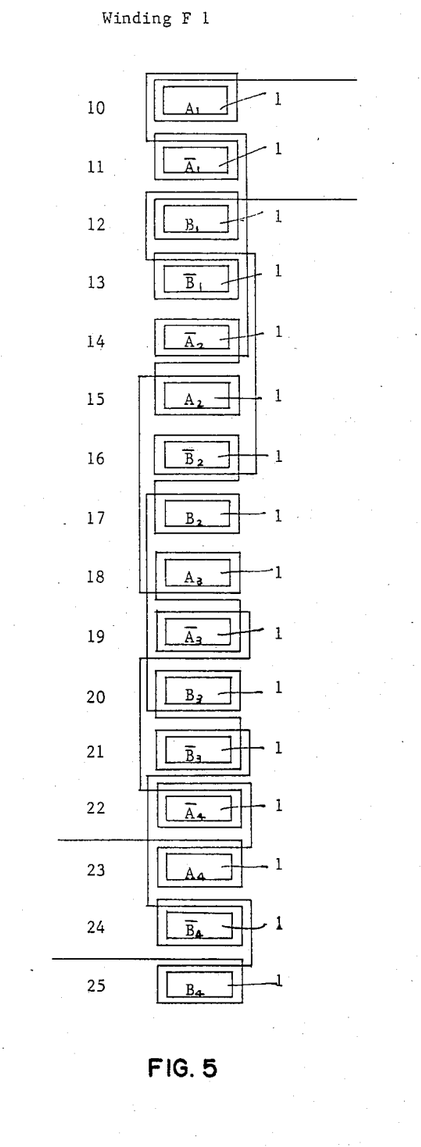
FIG. 5 is a schematic circuit diagram illustrating the windings of a stator in FIG. 1.
Figure 6:
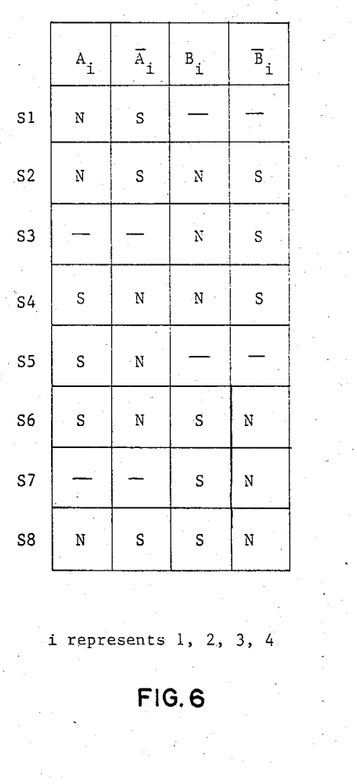
FIG. 6 is a table illustrating the firing sequence of a circuit F1 wherein windings corresponding to the windings of FIG. 5 are energized for half-stepping operation.
Figure 7:
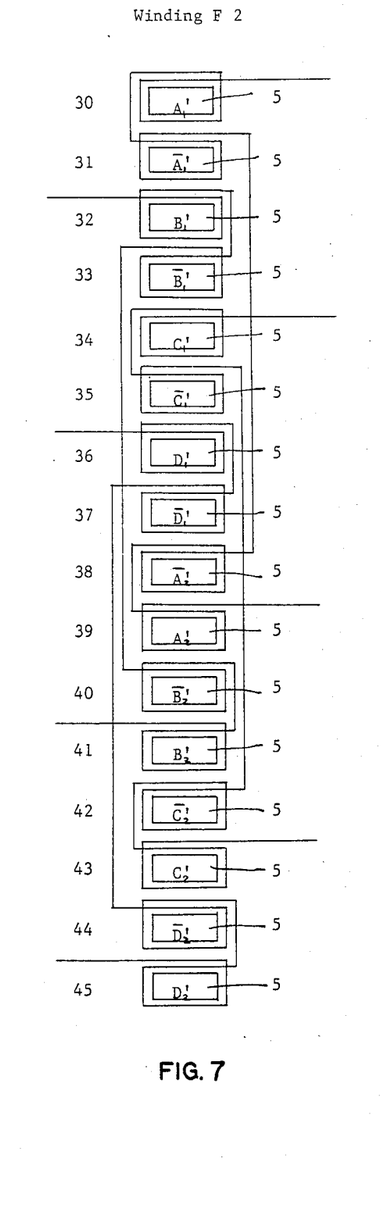
FIG. 7 is a schematic circuit diagram illustrating the windings of a stator in FIG. 2.
Figure 8:
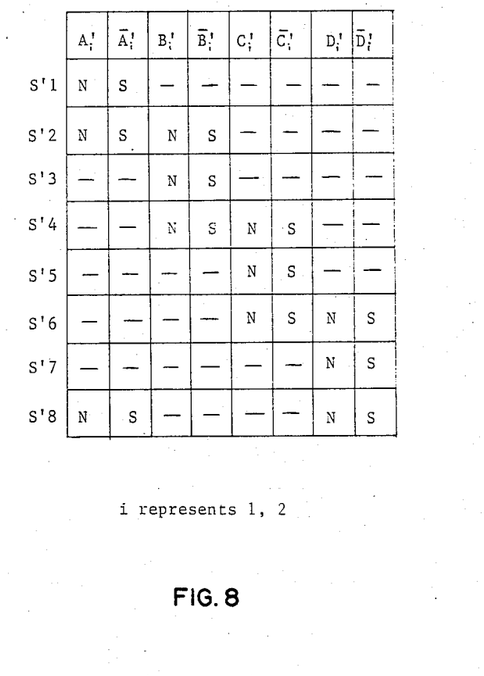
FIG. 8 is a table illustrating the firing sequence of a circuit F2 wherein windings corresponding to the windings of FIG. 7. are energized for half-stepping operation.

Included among the critical aspects of the invention, the stator windings 50, for example those designated 10 to 25 and 30 to 45, should be wound in such a manner that every two adjacent poles in the group are connected in series but different polarity as shown in FIG. 5 and FIG. 7 for hybrid and variable reluctant stepping motors respectively. The half-stepping sequences are followed as shown in FIG. 6 and FIG. 8 respectively to the winding F1 and F2. The consequence of this results the same magnetic flux paths regardless one-phase "ON" or two-phase "ON" as shown in FIGS. 9a, 9b and FIGS. 10a, 10b for hybrid and variable reluctant stepping motors respectively.

Figure 9A:
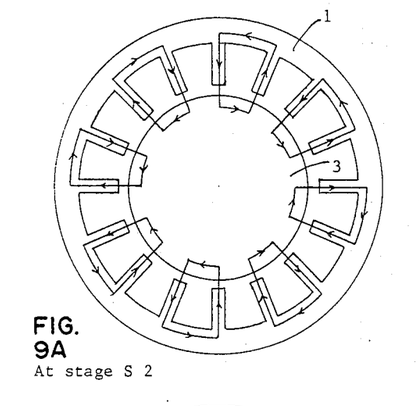
FIGS. 9a through 9c and FIGS. 10a through 10c illustrate the magnetic coupling at different stages for a hybrid stepping motor and variable reluctant motor respectively embodying features of the invention.
Figure 9B:
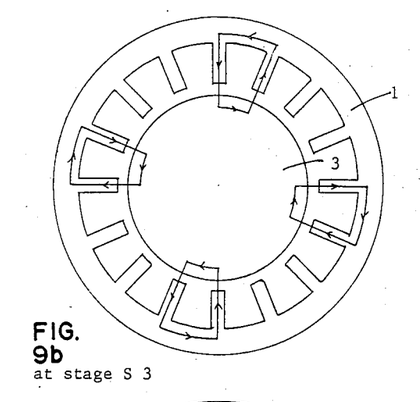
Figure 9C:
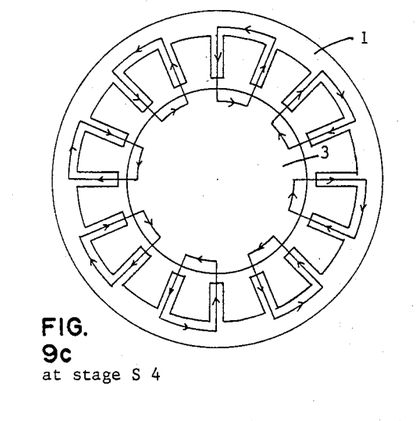
Figure 10A:
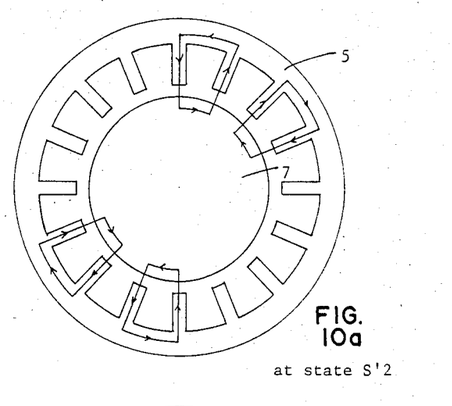
Figure 10B:
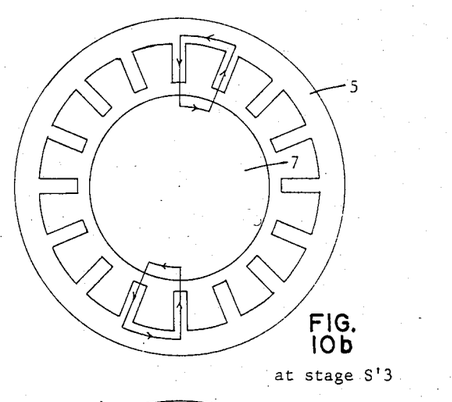
Figure 10C:
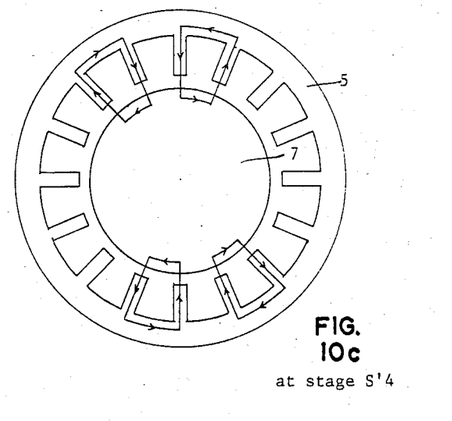
Figure 11A:
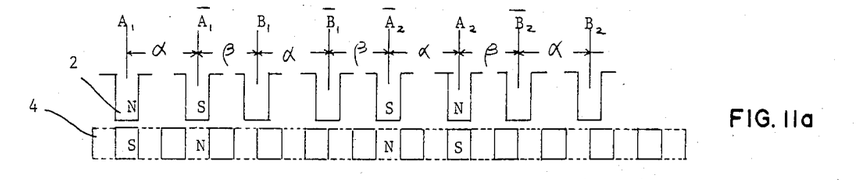
FIGS. 11a through 11h are graphic diagrams illustrating the relationships of the energized stator and rotor in FIG. 1 when energized according to the diagram of FIG. 6.
Figure 11B:
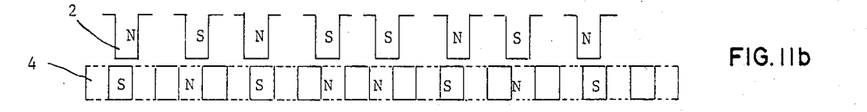
Figure 11C:
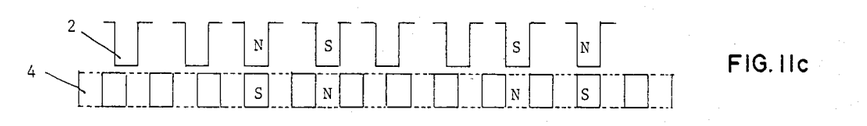
Figure 11D:
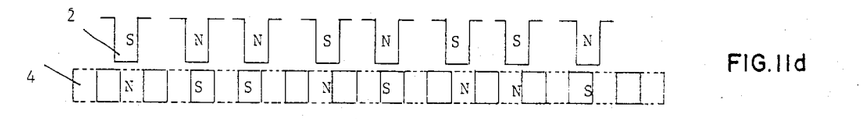
Figure 11E:
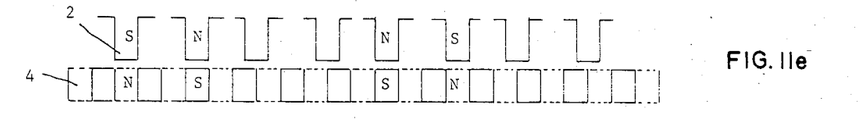
Figure 11F:
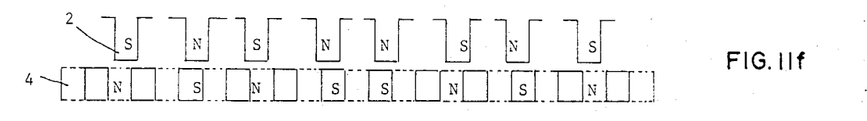
Figure 11G:
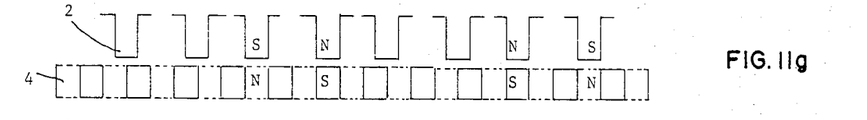
Figure 11H:
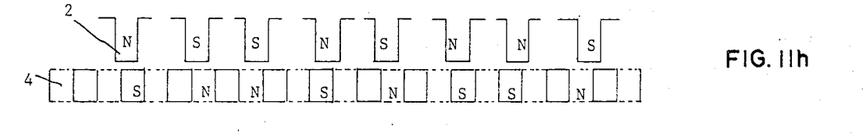
Figure 12A:
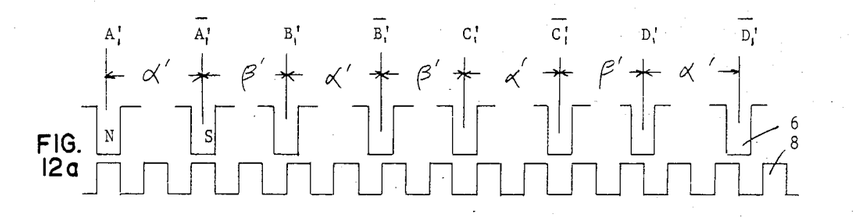
FIGS. 12a through 12h are graphic diagrams illustrating the relationships of the energized stator and rotor in FIG. 3 when energized according to the diagram of FIG. 8.
Figure 12B:
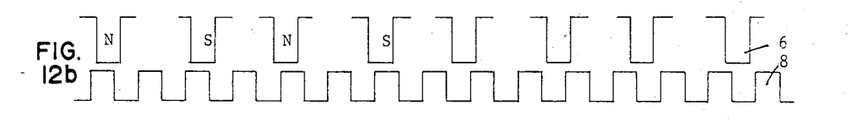
Figure 12C:
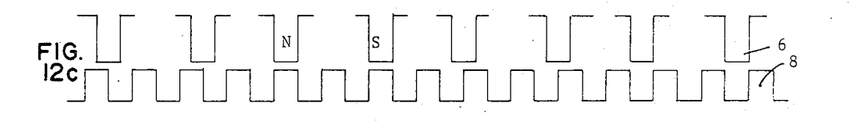
Figure 12D:
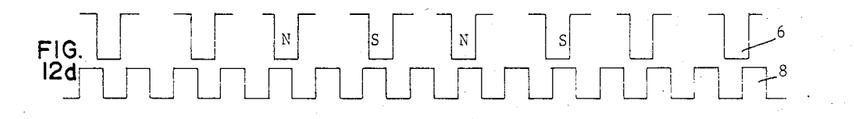
Figure 12E:
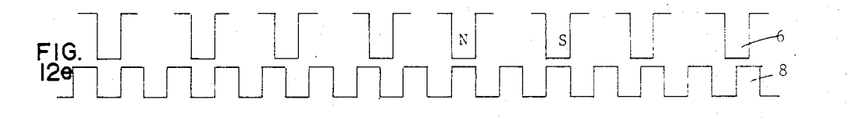
Figure 12F:
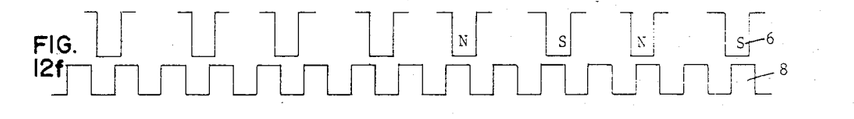
Figure 12G:
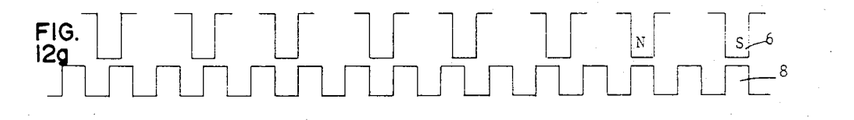
Figure 12H:
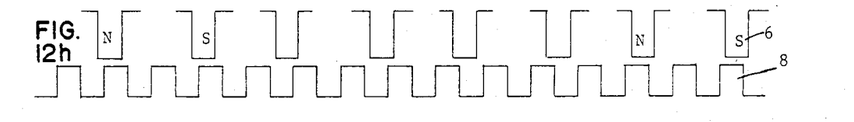

As a result, to step motor form two-phase mode to on-phase mode in direction shows no different in the motor embodying features of the invention as shown in FIGS. 9a to 9b comparing FIGS. 9c to 9b for hybrid stepping motor, and FIGS. 10a to 10b comparing FIGS. 10c to 10b for variable reluctant stepping motor.

FIG. 11 corresponds to FIG. 6. Here, the switch S1 to S8 are shown in the position corresponding to the 8 steps of stepping motor. Similar relations are shown in FIG. 12 comparing to FIG. 8.

In the embodiment of the invention illustrates a 16-pole design for $t=1.8°$, while a conventional design would have a 8-pole or 40-pole. A 40-pole motor is not practical for a size of the motor used in normal application. Therefore, 8-pole is the common design for $t=1.8°$.

In general, to maintain a similar value of phase resistance and torpue, number of turns per pole on a 16-pole motor, N(16) should be half of N(8) on a 8-pole motor. Thus $L(16)\alpha(N(16))^2$
$L(8)\alpha(N(8))^2$ Since $N(8)=2N(16)$
$L(8)\alpha(N(8))^2=(2N(16))^2$ Therefore $L(8)=2\times L(16)$ As a result, the phase inductance L(16) for a 16-pole motor is half of L(8) for a 8-pole motor. Therefore, a motor embodying features of the invention is able to respond at higher stepping frequency than a conventional stepping motor.

While the above description contains many specifities, these should not be construed as limitations on the scope of the invention, but rather as an exemplification of one preferred embodiment thereof. Many other variations are possible, for example the different step angle t with different number of pole M and so on. Accordingly, the scope of the invention should be deteminde not by the embodiment illustrated, but by the appended claims and their legal equivalents.

I claim:

1. A multiple pole stepping motor comprising,
an annular stator having an even number of stator poles around an inner circumference where adjacent stator poles are grouped in pairs, where each stator poles has a plurality of pole teeth, and wherein the angle α between the closest, adjacent teeth between said first stator pole and said second stator pole of each group is governed by the relationship:

$\alpha=2t(2n+1)$ where n is any integer greater than zero, and t is the step angle,
a stator winding which winds around a first stator pole of each pair of stator poles in a first direction, and which winds around a second stator pole of each pair of stator poles in a second direction, such that the said first stator pole and said second stator pole may develop a magnetic flux having the same phase but opposite polarity when said stator winding is energized, and
a rotor disposed within said annular stator, said rotor including magnetic means polarized in an axial direction between two ends thereof for carrying magnetic flux, a first pole cap having a number of rotor teeth being attached to a first end of said magnetic means, and a second pole cap having a number of rotor teeth being attached to a second end of said magnetic means, the rotor teeth of said first and second pole caps being juxtapositioned proximate to said teeth of said stator poles, where the rotor teeth of said first pole cap and the rotor teeth of said second pole cap are angularly offset.

2. A multiple pole stepping motor as recited in claim 1 wherein the angle β between the closest, adjacent teeth of a stator pole of a first pair of stator poles and a stator pole of a second pair of stator poles is governed by the relationship:

$\beta=t(2m+1)$ where m is any integer greater than zero, and t is the step angle.

3. A multiple pole stepping motor comprising,
an annular stator having an even number of stator poles around an inner circumference where adjacent stator poles are grouped into pairs, where each stator pole has a plurality of pole teeth, and wherein the angle β between the closest, adjacent teeth between said first stator pole and said second stator pole of each group is governed by the relationship:

$\beta=t(2m+1)$ where m is any integer greater than zero, and t is the step angle,
a stator winding which winds around a first stator pole of each pair of stator poles in a first direction, and which winds around a second stator pole of each pair of stator poles in a second direction, such that the said first stator pole and said second stator pole may develop a magnetic flux having the same phase but opposite polarity when said stator winding is energized, and
a rotor disposed within said annular stator, said rotor including magnetic means polarized in an axial direction between two ends thereof for carrying magnetic flux, a first pole cap having a number of rotor teeth being attached to a first end of said magnetic means, and a second pole cap having a number of rotor teeth being attached to a second end of said magnetic means, the rotor teeth of said first and second pole caps being juxtapositioned proximate to said teeth of said stator poles, where the rotor teeth of said first pole cap and the rotor teeth of said second pole cap are angularly offset.

4. A multiple pole stepping motor as recited in claim 3 wherein the angle α between the closest, adjacent teeth between said first stator pole and said second stator pole of each group is governed by the relationship:

$$\alpha = 2t(2n+1)$$

where n is any integer greater than zero, and t is the step angle.

5. A multiple pole stepping motor comprising, an annular stator having an even number of stator-poles around an inner circumference where adjacent stator poles are grouped into pairs, where each stator pole has a plurality of pole teeth, a stator winding which winds around a first stator pole of each pair of stator poles in a first direction, and which winds around a second stator pole of each pair of stator poles in a second direction, such that the said first stator pole and said second stator pole may develop a magnetic flux having the same phase but opposite polarity when said stator winding is energized, and a rotor disposed within said annular stator, said rotor including a disk shaped ferromagnetic member provided with a plurality of rotor teeth around its circumference, said rotor teeth being juxtapositioned proximate said teeth of said stator poles, wherein the angle $\alpha'$ between the closest, adjacent teeth between said first stator pole and said second stator pole of each group is governed by the relationship:

$$\alpha' = 4tn$$

where n' is any integer greater than zero, and t is the step angle.

6. A multiple pole stepping motor as recited in claim 5 wherein the angle $\beta'$ between the closest, adjacent teeth of a stator pole of a first pair of stator poles and a stator pole of a second pair of stator poles is governed by the relationship:

$$\beta' = t(2m'+1)$$

where m' is any integer greater than zero, and t is the step angle.

7. A multiple pole stepping motor comprising, an annular stator having an even number of stator poles around an inner circumference where adjacent stator poles are grouped into pairs, where each stator pole has a plurality of pole teeth, a stator winding which winds around a first stator pole of each pair of stator poles in a first direction, and which winds around a second stator pole of each fair of stator poles in a second direction, such that the said first stator pole and said second stator pole may develop a magnetic flux having the same phase but opposite polarity when said stator winding is energized, and a rotor disposed within said annular stator, said rotor including a disk shaped ferromagnetic member provided with a plurality of rotor teeth around its circumference, said rotor teeth being juxtapositioned proximate said teeth of said stator poles, wherein the angle $\beta'$ between the closest, adjacent teeth of a stator pole of a first pair of stator poles and a stator pole of a second pair of stator poles is governed by the relationship:

$$\beta' = t(2m+1)$$

where m' is any integer greater than zero, and t is the step angle.

8. A multiple pole stepping motor as recited in claim 7 wherein the angle $\alpha'$ between the closest, adjacent teeth between said first stator pole and said second stator pole of each group is governed by the relationship:

$$\alpha' = 4tn'$$

where n' is any integer greater than zero, and t is the step angle.

* * * * *